United States Patent [19]

Namba

[11] Patent Number: 4,494,849
[45] Date of Patent: Jan. 22, 1985

[54] FOCUS DETECTING DEVICE FOR A CAMERA

[75] Inventor: Yasuhiro Namba, Osaka, Japan

[73] Assignee: Minolta Camera Kabushiki Kaisha, Osaka, Japan

[21] Appl. No.: 472,883

[22] Filed: Mar. 8, 1983

[30] Foreign Application Priority Data

Mar. 9, 1982 [JP] Japan .................................. 57-37832
Dec. 27, 1982 [JP] Japan ................................ 57-230012

[51] Int. Cl.³ ............................................. G03B 3/00
[52] U.S. Cl. .................................................. 354/406
[58] Field of Search ................ 354/400, 402, 406, 407

[56] References Cited

U.S. PATENT DOCUMENTS 4,264,810 4/1981 Utagawa et al. .................... 354/406
4,307,947 12/1981 Jyoujiki ............................... 354/406

Primary Examiner—Russell E. Adams
Attorney, Agent, or Firm—Jackson, Jones & Price

[57] ABSTRACT

The focus detecting device herein disclosed is capable of detecting the amount of direction of defocus of an objective lens. The device includes a pair of photoelectric devices each disposed optically in parallel with an optical axis of the objective lens. The pair of the photoelectric devices are positioned so as to receive the light rays passed through two portions of the objective lens, respectively. The position along the optical axis on which the image plane of the objective lens is located is detected by means of comparing two images each detected by the photoelectric device.

31 Claims, 22 Drawing Figures

FOCUS DETECTING DEVICE FOR A CAMERA

BACKGROUND OF THE INVENTION

1. Field of the Invention

The present invention relates to a focus detecting device for a camera and more particularly relates to a focus detecting device of the type which detects the focusing condition of a camera objective lens on a target object to be photographed, by measuring the light coming from the target object and traversing the objective lens.

2. Description of the Prior Art

A proposed camera focus detecting device of the abovementioned type includes a pair of photocell arrays disposed at positions before and behind a plane that is optically equivalent to a predetermined focal plane e.g. the film plane of the camera, to measure contrasts of the images at the positions.

(1) As the light can not transmit the photocell array, the rear photocell array positioned behind the plane is shadowed by the front photocell array positioned before the plane. As a result, the rear photocell array cannot receive the light from a target object and cannot detect the contrast of the image formed thereon. To avoid this, the conventional focus detecting device had to employ a half-mirror to split the light beam and form two optical axes that are optically equivalent to each other and on which the photocell arrays are disposed respectively. However, since each photocell array is disposed on and perpendicularly with each optical axis, the optical system of the device required much space in the direction perpendicular to each optical axis.

(2) Since the proposed device can detect only whether the objective lens is at an in-focus position and on which side of the in-focus position the same is when it is at an out-of-focus position, the device cannot provide any quantitative data such as how much distance the objective lens should be shifted to reach an infocus-position. Accordingly, in the case when the focusing of the objective lens is automatically adjusted in accordance with the output of the known focus detecting device, the focusing condition must be detected with the objective lens being moved until the in-focus condition is detected whereupon the objective lens is stopped. However, in the case where the objective lens is moved at a high speed for quick response to the operation, the objective lens has moved beyond its in-focus position when the in-focus condition is detected. Thus it is difficult to attain high speed automatic focusing with such a known device.

SUMMARY OF THE INVENTION

As object of the present invention is to provide a focus detecting device which is simple and compact in construction and can detect the amount and direction of displacement of the image plane of an objective lens from its predetermined focal plane i.e. the amount and direction of defocus, thereby eliminating the problems (1) and (2) mentioned above.

Another object of the present invention is to provide a focus detecting device capable of detecting the amount and direction of defocus by means of a photoelectric means which is small in thickness.

Still another object of the present invention is to provide such a focus detecting device employing a photoelectric means which can be easily manufactured.

Yet another object of the present invention is to provide a focus detecting device wherein a number of thin photoelectric elements are arranged substantially in parallel with the optical axis of the objective lens such that the elements scarcely interrupts the light in spite of being disposed within the path of light from the objective lens.

DETAILED DESCRIPTION OF THE PREFERRED EMBODIMENTS

The development of semiconductor technology enables formation of extremely thin layers of semiconductor elements such as photodiodes on a base plate of glass. With this technique, an extremely thin layer of photocell arrays can be formed on a glass base plate. If a pair of glass base plates on which photodiode arrays are respectively formed with the light-receiving surface of the photodiodes being in contact with their base plate, and are put together in a face-to-face relationship sandwiching the photodiode arrays, a photoelectric member having a pair of light-receiving or photosensitive surface on both sides of a single plane in substance is formed. If such a thin photoelectric member is disposed on the optical axis of an objective lens with the single plane being in parallel with the optical axis, the member can detect the light passed through the objective lens while scarcely interrupting the light. Thus, if a plurality of such photoelectric members are disposed along the optical axis, information or data of focusing conditions at plurality of positions along the optical axis is obtainable without splitting the light by the half-mirror, whereby quantitative information of a defocus condition can be obtained which represents a position along the optical axis at which the image of an target object on which the objective lens is to be focused, i.e. at what distance from a predetermined film plane the image of the target object is formed.

Figure 1:
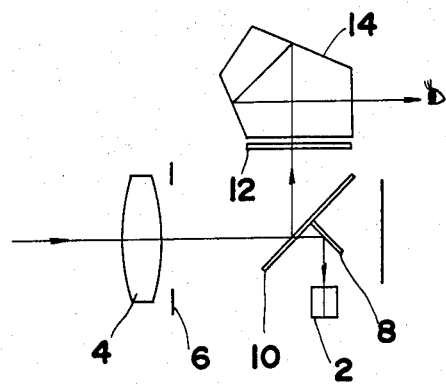
FIG. 1 is a schematic side elevational view showing the arrangement of the elements of the camera according to a first embodiment of the present invention.

FIG. 1 shows an exemplary disposition of photoelectric means 2 according to a first embodiment of the present invention. As seen in the Figure, photoelectric means 2 is located at the bottom of a mirror box (not shown) of a single lens reflex camera which comprises objective lens 4, diaphragm 6, semitransparent reflex mirror 10 with auxiliary or sub reflex mirror 8, focusing plate 12, pentagonal prism 14 and so on.

Figure 2:
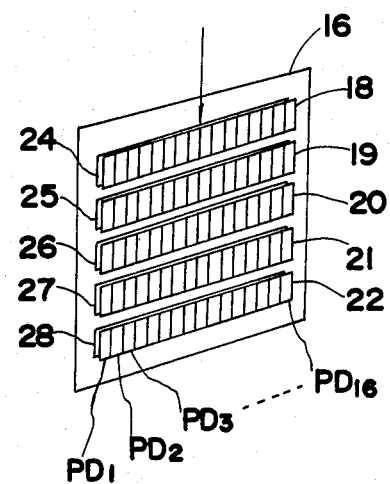
FIG. 2 is a perspective view showing the construction of a photoelectric means as the essential portion of the focus detecting device of the first embodiment.

FIG. 2 shows a structure of the photoelectric means which forms the characteristic portion of a focus detecting device as the first embodiment of the present invention. A pair of groups of photocell arrays 18 to 22 and 24 to 28 are disposed on both sides of a plane 16 with the arrays of one group respectively facing those of the other group in a back-to-back relationship. Each photocell array comprises a plurality of photodiodes PDi (i=1 to 16) arranged linearly and having the same area of light-receiving surface. It should be understood that the number of the photocell arrays and the number of the photodiodes included in each array are not limited to those shown in FIG. 2.

Figure 3A:
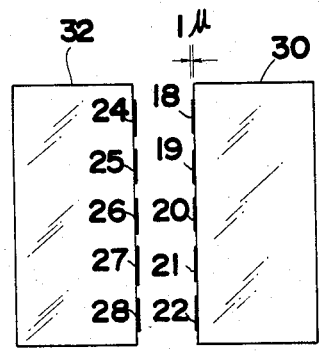
FIG. 3 shows the side view of the photoelectric means, FIG. 3a showing an exploded view and FIG. 3b showing the assembled or combined condition.

FIG. 3 shows a definite structure and the manner of its construction (or composition) of the photoelectric device with the arrangement of photocell arrays as shown in FIG. 2. With reference to FIG. 3a, photocell arrays 18 to 22 shown in FIG. 2 are formed on a glass block 30 while photocell arrays 24 to 28 are formed on another glass block 32. The photodiodes of each array are composed of amorphous silicon photodiodes which are coated on the glass block with their light receiving, i.e. photosensitive surface facing and being in contact with the glass block. In other words, the photodiodes are formed to receive the light passing through the glass block.

Figure 3B:
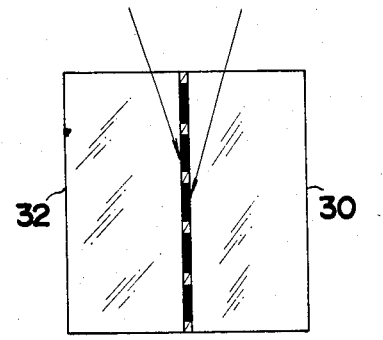

Glass blocks 30 and 32 which have formed thereon the photocell arrays are cemented to each other to form a sandwich of the photocell arrays therebetween as shown in FIG. 3b. As the layer of the amorphous silicon photodiode can be formed to about 1 µm (micrometer) of thickness by vacuum evaporation, the space between the two glass blocks may be about 2 µm, so that the photocell arrays of the two groups cemented in back-to-back relationship may be treated in practice as if on the same plane.

Figure 4:
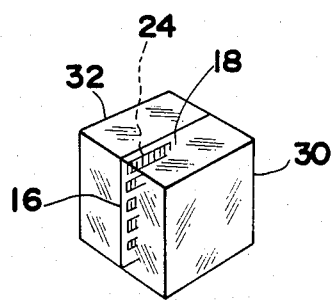
FIG. 4 is a perspective view of the photoelectric means in the fully-assembled state.

FIG. 4 shows the outer appearance of the photoelectric member thus composed.

Figure 5:
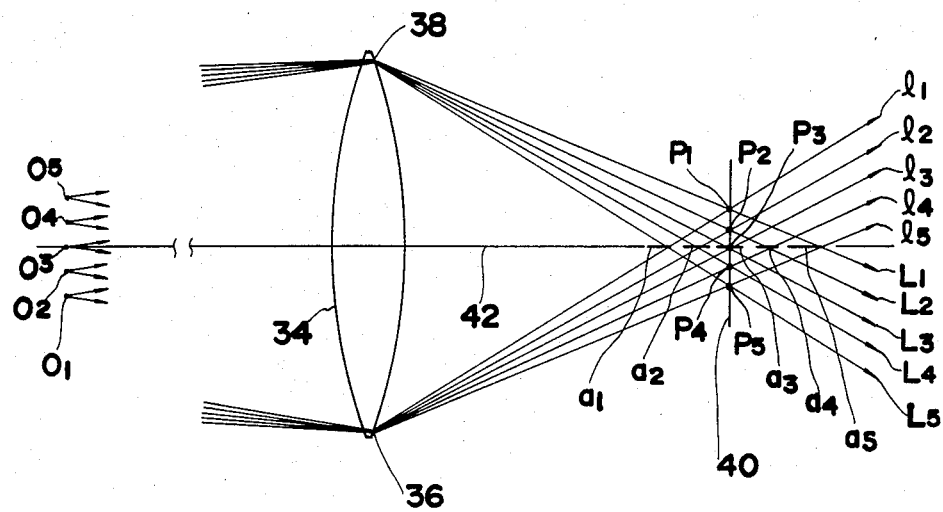
FIG. 5 is a schematic view of a radiation distribution pattern for illustrating the principle of focus detection according to the present invention.

Explanation will now be made about the principle of focus detection by means of the photoelectric members constructed as described above. With reference to FIG. 5, light rays l1 to l5 and L1 to L5 passing through particular points 36 and 38 near the periphery of an image-forming or converging lens 34 are taken into consideration. The light rays are emitted from five point sources O1 to O5 in front of the lens and are converged at points P1 to P5 forming corresponding point images. It is to be noted that the light rays represented by the reference characters of the same subscript, i.e. rays l1 and L1, l2 and L2, l3 and L3, l4 and L4 and 5 and L5 are respectively emitted from the same point source. Let's consider the portions on optical axis 42 represented by segments a1 to a5. As seen from the Figure, the rays l3 and L3 passing through points 36 and 38 on lens 34 and entering segment a3 are emitted from the same point source O3. However the ray pairs entering other individual segments a1, a2, a4 and a5 through points 36 and 38 on lens 34 are from the different sources. Additionally, as the lens are focused at the plane 40 intersecting segment a3, the spatial frequency or the contrast of the image formed on the plane 40 is highest and becomes lower as the plane of the image is spaced forward or backward away from the plane 40. Thus, as disclosed in FIG. 6, two photoelectric element arrays Q1 to Q5 and Q6 to Q10 are arranged to sandwich the optical axis 46 of lens 44 and receive the light respectively having the directional components shown by arrows 48 and 50, the pair of upper and lower photoelectric elements on which the lens 44 is focused generate photoelectric outputs which are equal to each other because they receive light from the identical point source. For example, when the image plane (the plane on which the image of a target object is formed by the objective lens, i.e. lens 44) extends across or through photoelectric elements Q3 and Q8, the two photoelectric elements Q3 and Q8 produce the identical output. On the other hand, the pair of photoelectric elements e.g. Q2 and Q7 which are positioned away from the image plane receive light from different point sources and in general produce different outputs because the brightness differs with the point sources. Accordingly, if a pair of photoelectric elements which produce the identical output are detected, the position of the image plane of the objective lens, i.e. the focused position can be seen.

Figure 6:
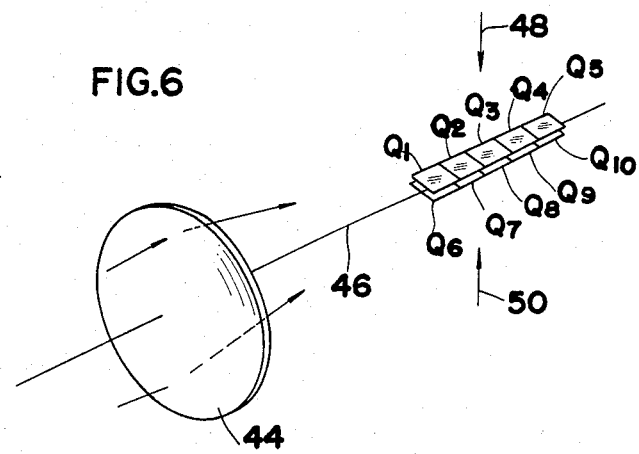
FIG. 6 is a perspective view showing an exemplary simplest arrangement of the photoelectric elements according to the present invention.
Figure 7:
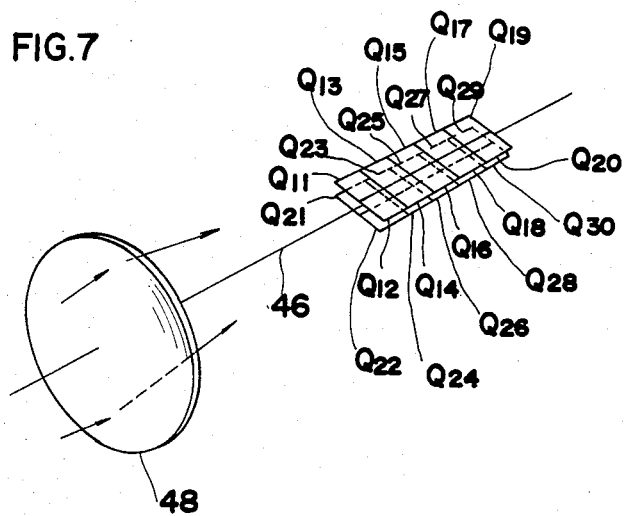
FIG. 7 is a perspective view showing a basic arrangement of the photoelectric elements of the embodiment for detecting the focusing by utilizing the information of contrast.

If the photoelectric elements are arranged as shown in FIG. 7 such that two elements arranged in the transverse direction i.e. perpendicularly to the optical axis 46 are replaced for each element of FIG. 6, the focusing condition can be detected by a signal processing method different from that for the focus detecting means in FIG. 6. With reference to FIG. 7, assuming that the image plane extends across or through photoelectric elements Q15, Q16 and Q25, Q26, the difference between the outputs of photoelectric elements Q15 and Q16 is equal to that of photoelectric elements Q25 and Q26 and is larger than any other difference of outputs of adjacent photoelectric elements e.g. Q13 and Q14, i.e. the largest of all differences. Additionally, on the above assumption, the differences of outputs of upper adjacent pairs of photoelectric elements Q15 and Q16 generally coincides with the difference of outputs of lower adjacent pairs of photoelectric elements Q25 and Q26, because such upper and lower pairs of photoelectric elements generally receive light from identical point sources respectively. Accordingly, with the focus detecting means as shown in FIG. 7, the position of the image plane can be detected either by detecting, within the upper group of photoelectric elements Q11–Q20 or the lower group of elements Q21–Q30, the position of a pair of adjacent two photoelectric elements of which the difference output is maximum, or by detecting the position of the upper adjacent two photoelectric elements whose difference in output is substantially equal to the difference of the outputs of corresponding lower adjacent two photoelectric elements. The above is the explanation of the principle of focus detection in the focus detecting device according to the present invention. Although only two photoelectric elements are employed to detect the light intensity distribution in the direction perpendicular to the optical axis on both (e.g. upper and lower) sides of the optical axis, more photoelectric elements may preferably be arranged in the perpendicular direction, as shown in FIG. 2, at each position along the optical axis to enhance the amount of information.

Returning to FIG. 2, the contrast of the image i.e. the light intensity distribution along each photocell array may be detected by a charge coupled device (hereinafter referred to as CCD) which constitutes the photocell array, in the manner that the outputs of the elements of the CCD are read out one-by-one in time series and the differences between each successive two outputs is detected and accumulated for each photocell array. The accumulated value represent the contrast detected by each photocell array. If such contrast detecting process is effected for each photocell array to find out the back-to-back opposite pair of photocell arrays that provide equal contrast signals, the position of the image plane can be known by identifying the pair. Such signal processing may be made by means of a microcomputer.

Explanation will now be made, with reference to FIGS. 8 and 9, about an embodiment employing an analog circuit for deriving a contrast signal from the outputs of the photodiodes of a photocell array as shown in FIG. 2.

Figure 8:
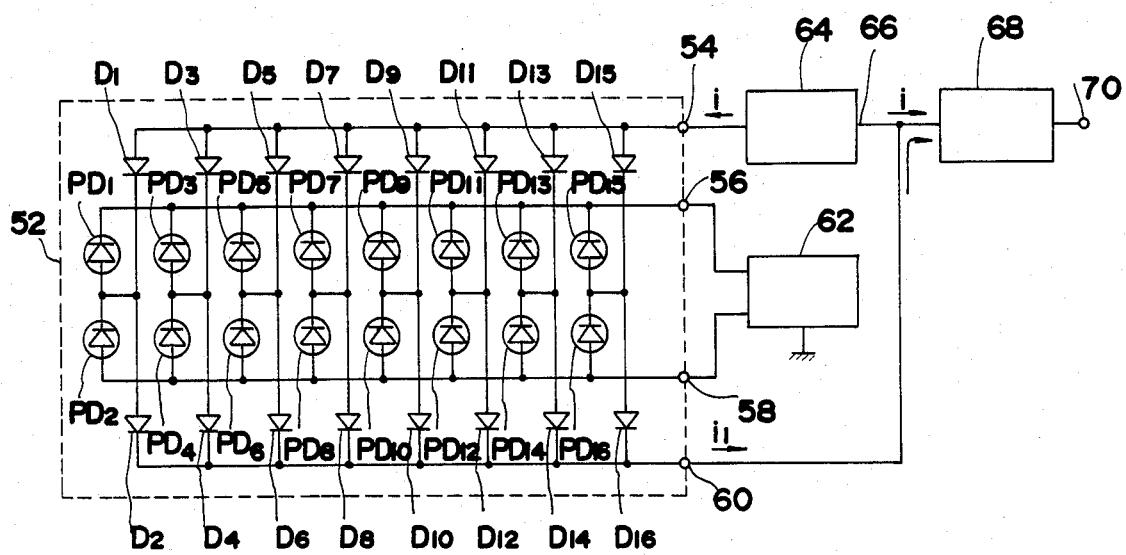
FIG. 8 is a circuit diagram of an exemplary circuit for deriving contrast signals from photodiode arrays of the photoelectric means of the first embodiment.

In FIG. 8, the portion enclosed by broken line 52 corresponds to one of the photocell array formed on the glass block in FIG. 3. Although photodiodes PD1 through PD16 are shown as being arranged in two rows, they are in practice arranged along a single row as shown by the array 18 in FIG. 2. Those photodiode arrays respectively include parallelly-connected units of photodiodes, each unit comprising two photodiodes which are serially connected in the same polarity. Diodes D1 through D16 are also grouped into units, each of which includes two diodes connected in series with each other. The node or junction is between the diodes of a unit. It is to be understood that the above described contrast detecting circuit has been proposed in U.S. Pat. No. 4,039,824. Bias voltage source 62 applies an appropriate inverse bias voltage to each photodiode unit through terminals 56 and 58. Mirror current circuit 64 generates at output terminal 66 an output current that is equal to the current i flowing into the photodiode array through terminal 54. Logarithmic compression circuit 68 is adapted to produce a voltage proportional to the logarithm of the sum of the currents supplied from output terminal 66 of Mirror current circuit 64 and from terminal 60. Then the operation of the circuit constructed as mentioned above will be explained. At first let's consider the operation of a single unit only composed of photodiodes PD1 and PD2. When photodiode PD1 receives stronger light than photodiode PD2, photodiode PD1 produces photoelectric current which is larger by $\Delta i_1$ than photoelectric current produced by photodiode PD2. Then, such differential current $\Delta i_1$ produced by photodiodes PD1 and PD2 flows out through diode D2 and terminal 60 to logarithmic compression circuit 68. In contrast thereto, when photodiode PD2 receives stronger light than photodiode PD1, the former produces a photoelectric current which is larger by $\Delta i_2$ than the photoelectric current of the latter. Such differential current $\Delta i_2$ is provided from Mirror current circuit 64 through terminal 54 and diode D1, and accordingly the same current $\Delta i_2$ is also applied to logarithmic compression circuit 68 from Mirror current circuit 64. When photodiodes PD1 and PD2 receive light of equal intensity, the difference of photoelectric current will not appear. The operation of detecting the photoelectric current difference referred to above in connection with photodiodes PD1 and PD2 is also attained by other photodiode units. Thus, logarithmic compression circuit 68 receives the total sum of the differential currents produced by all the photodiode units, and generates an output voltage commensurate with the logarithmic compressed value of the total sum of the current. The output voltage is not any other than that representative of the contrast of the image on the photocell array.

Figure 9:
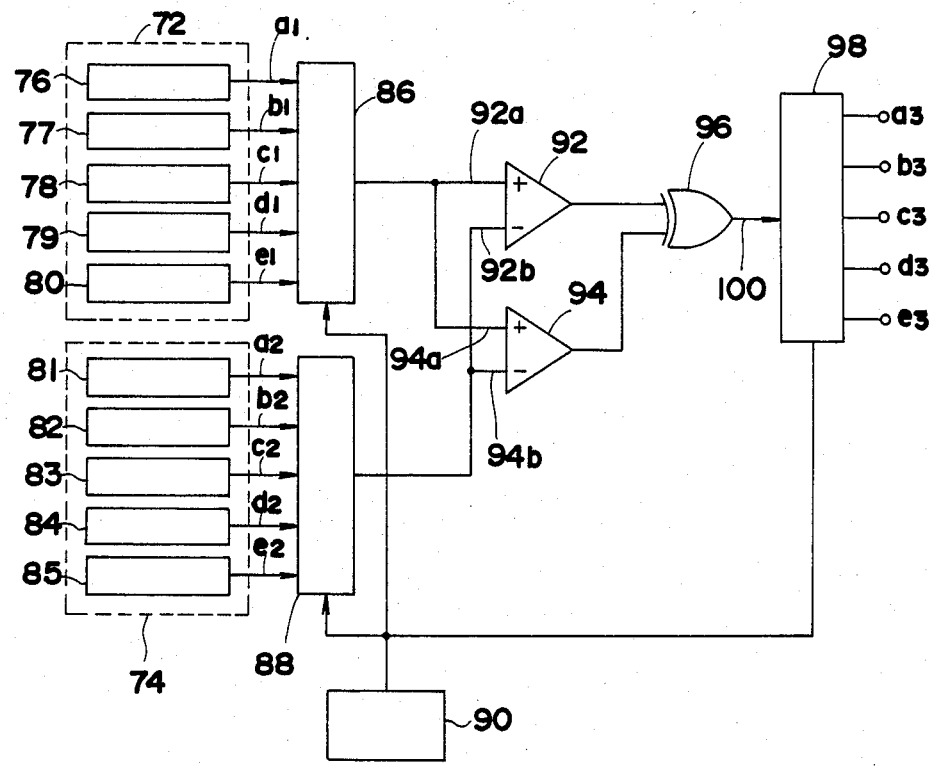
FIG. 9 is a block diagram showing the general design of the focus detecting circuit.

FIG. 9 shows a general circuit construction of a focus detecting circuit employing the contrast detecting circuit of FIG. 8. Each of contrast detecting circuits 76 through 80 and 81 through 85 in blocks 72 and 74 enclosed by broken lines, has the construction of the contrast detecting circuit in FIG. 8. The photocell arrays included in contrast detecting circuits 76 through 80 within block 72 correspond to photocell arrays 18 through 22 formed on one side of plane 16 in FIG. 2, while those within block 74 correspond to photocell arrays 24 through 28 on the other side i.e. on the rear side of plane 16. Signal selection circuits 86 and 88 sequentially select input signals a, b, c, d and e in response to control signals from control circuit 90. When circuit 86 selects signal a1, circuit 88 selects signal a2. In a like manner, when circuit 86 selects signals b1, c1, d1 and e1 respectively, circuit 88 correspondingly selects signals b2, c2, d2 and e2. The coincidence detecting circuit composed of voltage comparator circuits 92 and 94 and exclusive OR gate 96 detects whether the two contrast signals supplied through signal selection circuits 86 and 88 are equal or not to each other. Voltage comparator circuit 92 is off-set to generate a "High" level output not only when the voltage level applied to its positive input 92a is higher than that applied to its negative input 92b, but also when the former voltage is lower than the latter voltage to an extent within a predetermined voltage range. On the other hand, voltage detector 94 is off-set with the same range but in the opposite direction with respect to the change of the relationship between its two input signals, from the direction of offset of voltage comparator 92. The range or amount of the offset may be determined to an appropriate value based on experience. When the levels of the two contrast signals from signal selection circuits 86 and 88 are equal to each other or their difference is within the offset voltage, voltage comparator circuits 92 and 94 produce a "High" and a "Low" level output and exclusive OR gate 96 produces a "High" level output in response to the outputs of comparator circuit 92 and 94. Thus, the "High" level signal of exclusive OR gate 96 represents that two corresponding contrast signals coincide with each other and that the image plane of the objective lens is at the position of the photocell arrays that generate the contrast signals. When the corresponding contrast signals are not in the above relationship, i.e. different from each other to an extent beyond the offset range, voltage comparator circuits 92 and 94 produce both "Low" level outputs or both "High" level outputs so that exclusive OR gate 96 generates a "Low" level output. Thus, coincidence or incoincidence of each pair of input signals is detected.

Figure 10:
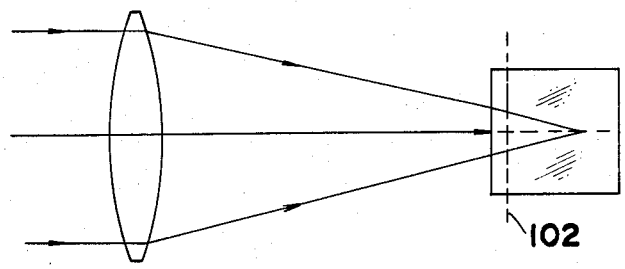
FIG. 10 is a side elevational view showing the essential portion of the optical system of another design according to the embodiment.

Output selection circuit 98 transmits the signal applied to its input 100, selectively and sequentially to output terminals a3, b3, c3, d3 and e3 in synchronization with the input signal selection of signal selection circuits 86 and 88. If the photoelectric means shown in FIG. 2 is arranged such that photocell arrays 20 and 26 at the third line, for example, are intersected by a plane optically equivalent to the film plane, the objective lens is at the focused position when a "High" level signal is generated at output terminal c3 of output selection circuit 98. When the objective lens is in an out-of-focus position, the amount and direction of the deviation of the image plane of the objective lens from the film plane can be known by detecting from which output terminal of output selection circuit 98 a "High" level voltage is being generated. In the above embodiment, the position of the photocell array on which the image plane is formed can be detected. It is easy to detect the amount of the deviation of the image plane from the predetermined focal plane, i.e., the amount of defocus of the objective lens by using the position detected. In the embodiment, the range of the deviation detection may be expanded along the optical axis by increasing the number of photocell arrays arranged along the optical axis. If the photoelectric means is disposed such that the first row of photocell arrays coincides with the conjugate plane 102 i.e. the plane optically equivalent to the film plane as shown in FIG. 10, the range for detecting the deviation in the rear focus condition may be extended. In this case although the amount of the deviation in the front-focus condition cannot be detected because the above described coincidence signal cannot be obtained. However, the front-focus condition can be known by the fact that any rear side out-of-focus signal is not produced.

Figure 11:
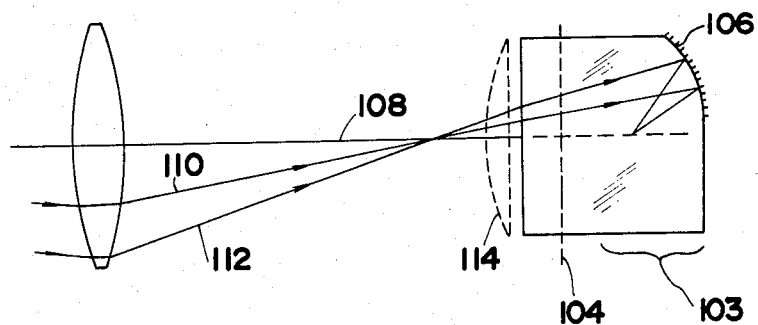
FIG. 11 is a side elevational view showing the essential portion of the optical system of still another design according to the second embodiment.

FIG. 11 shows a second embodiment wherein one of the glass blocks of the photoelectric means is formed with an internal spherical mirror 106 at its rear end. The broken line 104 represents the plane equivalent to the film plane. A large portion of photocell arrays are disposed behind the plane. The spherical mirror 106 has its center at the point where the plane 104 equivalent to the film plane intersects optical axis 108. With this construction, rays 110 and 112 converging before equivalent plane 104 are re-converged, as shown in the Figure, on a photocell after being reflected by spherical mirror 106. As spherical mirror 106 is formed on one of the glass blocks, the upper group of the photocell arrays are utilized for detecting the amount of the deviation in the front-focus condition. In the case of a rear-focus condition, the contrast signals are generated in the same manner as in the case of FIG. 10. Thus, the construction of FIG. 11 can provide information on the amount of the deviation i.e. the amount of defocus whether the rays converge at the rear or front of the plane equivalent to the film plane. If convex lens 114 is disposed in front of photoelectric means 103 of FIG. 11 to converge the rays incident on photoelectric means 103, the length of photoelectric means 103 in the direction of the optical axis may be shorten.

According to the camera focus detecting device of the embodiments constructed as described above, focus detecting elements are arranged in parallel with the optical axis without any optical means for splitting the light, thereby dispensing with any optical means for splitting the light. As a result the device can be simple and compact in construction. Additionally, as the device can detect the amount of defocus, it may be adapted for use in a highly responsive or high speed automatic focusing device because the focus detecting device enables driving of the objective lens for a distance determined previously (prior to its operation) in accordance with the detected amount of defocus.

Figure 12:
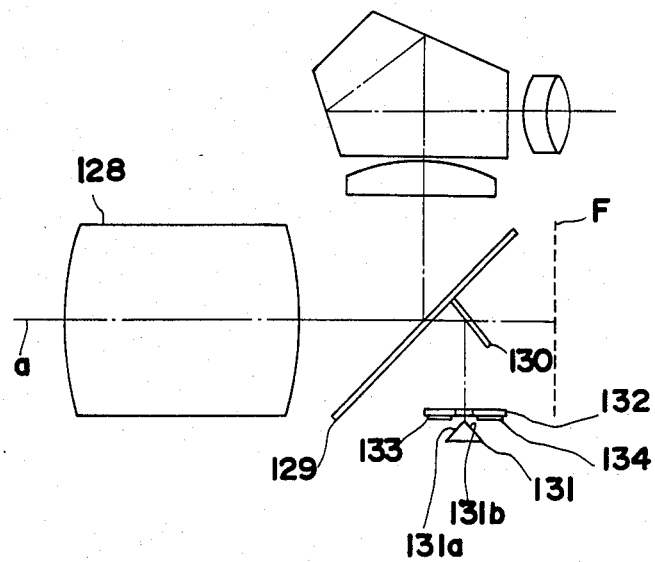
FIG. 12 is a schematic side elevational view showing the optical design according to the third embodiment of the present invention.

FIG. 12 is a schematic illustration of the arrangement of the optical elements according to a third embodiment of the invention. The optical system is of a single lens reflex camera and includes objective lens 128, reflex mirror 129 (a portion of which is semi-transparent), and auxiliary mirror 130. Reflex mirror 131 is composed of a right triangular prism with adjacent reflective plane 131 and 132 making a right angle and disposed symmetrically with respect to the vertical plane including the optical axis a. Mirrors 131a and 131b are coated with light-reflective material. Accordingly reflective planes 131a and 131b reflect the optical axis a in both sides to the direction normal to the incident optical axis. Base plate 132 with aperture 132a for allowing light to pass therethrough is disposed at a right angle with the optical axis and in parallel with the reflected optical axis. Photodiode groups 133 and 134 are formed on base plate 132 with their light-receiving surface being in parallel with the reflected optical axis.

Figure 13:
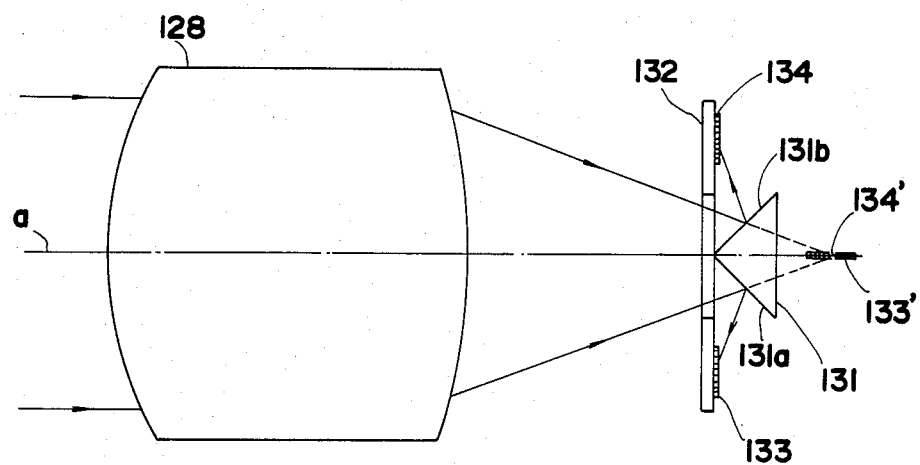
FIG. 13 is an enlarged side elevational view of the essential portion of the embodiment.
Figure 14:
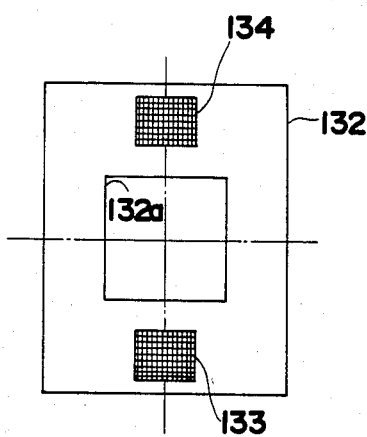
FIG. 14 is the rear elevational view of the same.
Figure 15:
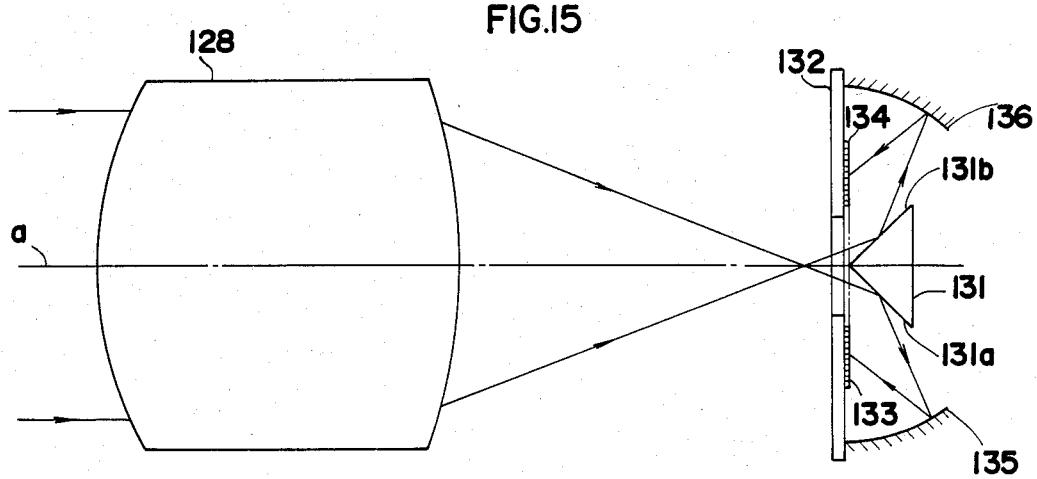
FIG. 15 is a schematic side elevational view of the fourth embodiment.

FIG. 13 is a fragmentary enlarged schematic illustration of the focus detecting optical system shown in FIG. 12 for explaining in detail its structure. In the Figure, photodiode groups 133 and 134 are respectively composed of a large number of minute or fine photodiodes arranged two-dimensionally. A Solid-State Image Sensing Device such as a Charge Coupled Device (CCD), Bucket Brigade Device (BBD), Charge Injection Device (CID), or MOS type Image-Sensor may be used for the photodiode group. As explained above, photodiode group 133 is disposed along one of the optical axes folded 90° downwards (as viewed in the Figure) by reflective plane 131a while photodiode group 134 is disposed along the optical axis folded 90° upwards (as viewed in the Figure) by reflective plane 131b. Accordingly, the disposition of the photodiode groups is optically equivalent to their disposition at the positions 133' and 134' as shown by broken lines in the Figure. It should be noticed that the reflex mirror 131 of the triangular prism is disposed before the predetermined focal plane. As seen from the Figure, it is possible to dispose two photodiode groups 133 and 134 on the same plane, by splitting the optical axis with a rectangular prism into two optical axes which are folded by 90°. FIG. 14 shows the view of base plane 132 as seen from the rear of the plate. FIG. 15 is a schematic illustration of the optical system of a focus detecting device according to a fourth embodiment of the present invention. In the Figure, the same elements and functional portions as those of FIG. 13 are denoted by the same reference numerals. In this embodiment, reflex mirror 131 of the triangular prism is disposed behind the predetermined focal plane of objective lens 128 and concave mirrors 135 and 136 are respectively disposed in the light path folded by reflective surfaces 131a or 131b. Concave mirror 135 and 136 have the same shape and are disposed symmetrically with respect to optical axis a with their centers lying on the optical axis folded by reflective surface 131a and 131b. With such a construction, the rays reflected by reflective plane 131a is further reflected by concave mirror 135 and converged on the surface of photodiode group 133, the rays reflected by the reflective plane 131b is further reflected by concave mirror 136 and converged on the surface of photodiode group 134. In the above embodiment, the secondary image of the image formed by objective lens 128 is formed on the photodiode groups by means of the concave mirrors. Such an optical arrangement makes it possible to optionally determine the distance between the photodiode groups and the objective lens, and accordingly is suitable for use in a device such as a camera in which the space for accommodating the focus detecting device is limited. Additionally, with the construction as shown in FIG. 15, the light rays can be projected on the photodiode groups with larger angles of incidence in comparison with the case of FIG. 6 and 7, resulting in an advantage that the amount of light lost by the surface reflection of the photodiode groups is reduced.

Figure 16:
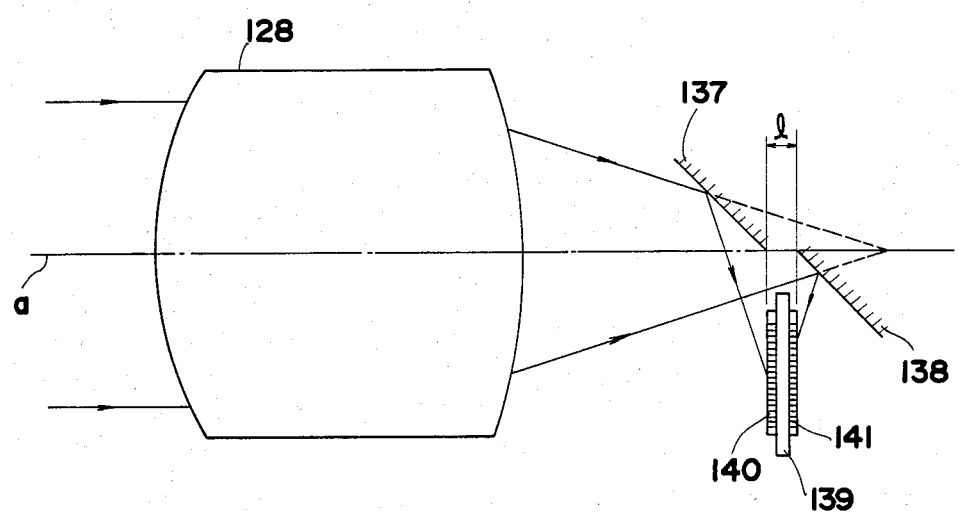
FIG. 16 and 17 are schematic side elevational views of the fifth and sixth embodiments.

FIG. 16 is a schematic illustration of a further modified optical system of a focus detecting device according to the fifth embodiment of the present invention. Reflective mirror 137 reflects light rays above the optical axis a, by a desired angle. Photodiode group 140 is disposed such that its light receptive surface lies along the reflected optical axis mentioned above. Reflective mirror 138 is disposed in parallel with reflective mirror 137 being spaced from the latter by a distance 1 in the direction of the optical axis, and as adapted to reflect the light rays below the optical axis, by a desired angle. Photodiode group 141 is disposed such that its light receptive surface lies along the optical axis deflected by reflective mirror 138. Accordingly the light-receptive or receiving surfaces of photodiode groups 140 and 141 are spaced by the distance 1 in the direction of the original optical axis and in parallel with each other, whereby the photodiode groups can be mounted on the opposite sides of an appropriate base plate 139. The above construction can save space in the direction perpendicular to the optical axis.

Figure 17:
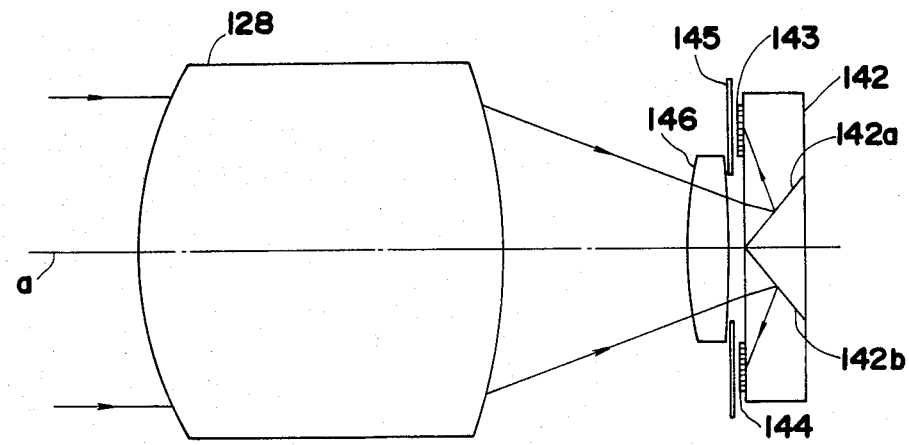

FIG. 17 schematically illustrates an exemplary optical system of a focus detecting device according to the sixth embodiment of the present invention wherein A-Si (amorphous silicon) is used for the photodiode groups. In the Figure, optical prism member 142 is formed of transparent glass and is provided with reflective planes 142a and 142b disposed symmetrically with respect to optical axis a. Those reflective planes are disposed such that light rays reflected thereby travel along the surface of prism member 142. Photodiode groups 143 and 144 of the A-Si are formed on the surface of prism members 143 symmetrically with respect to the optical axis. Light-blocking member 145 also serves as a diaphragm and functions to prevent detrimental light which would directly fall on photodiode group 143 or 144 from the back thereof without passing through prism member 142. Lens 146 is interposed between prism member 142 and objective lens 128 for the compensation of chromatic and spherical aberrations and field curvature due to the passage of the light through prism member 142. With this construction, the light rays converged by objective lens 128 passes through and is refracted by lens 146 and then is reflected by reflective plane 142a or 142b in prism 142 to form each image on photodiode group 143 or 144.

Figure 18:
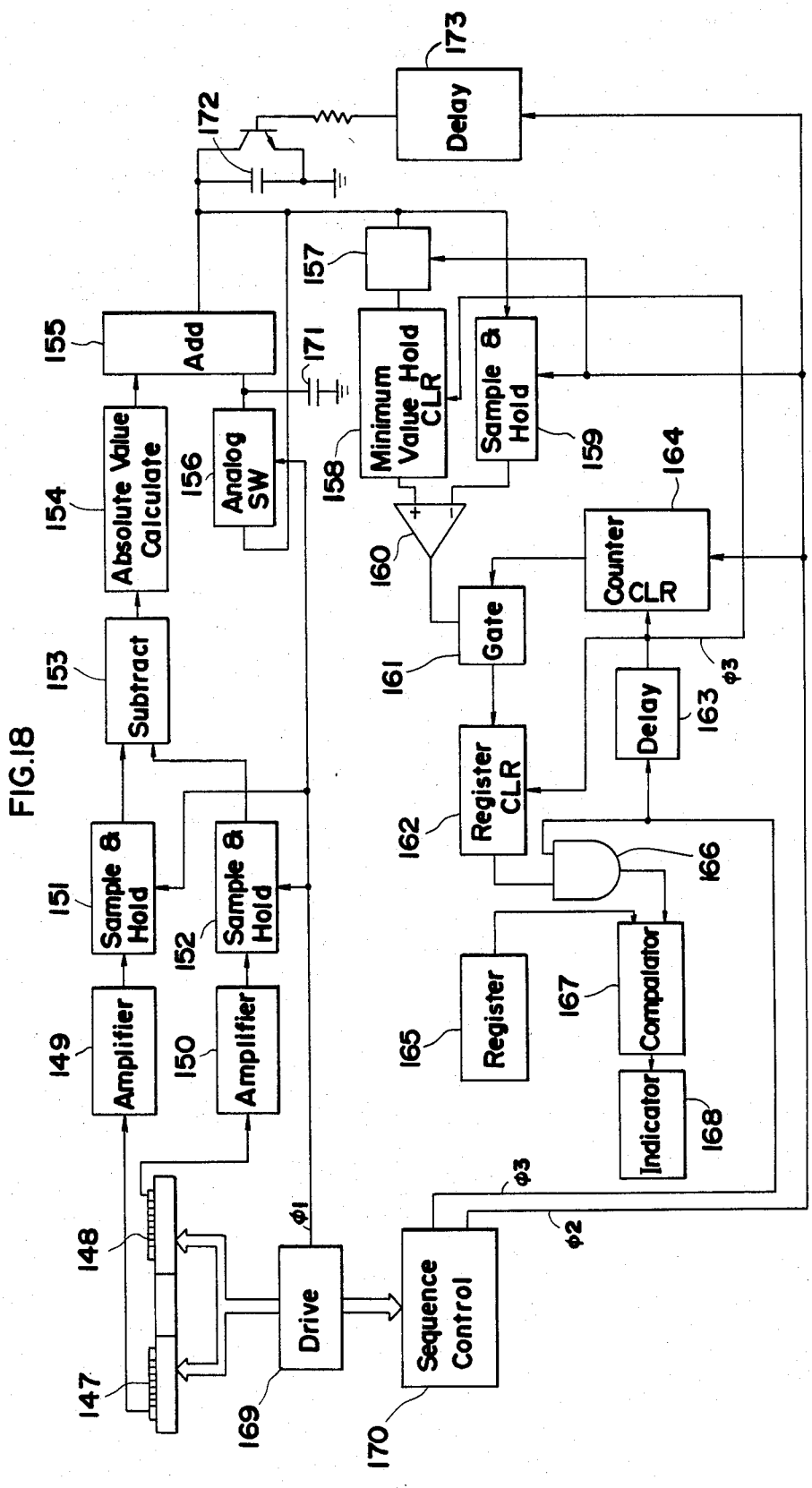
FIG. 18 is a block diagram of an exemplary signal processing circuit according to the present invention.

FIG. 18 shows an example of a signal processing circuit according to the present invention wherein two sets of two-dimensional CCDs are used as the photodiode groups in the focus detecting device of the design as shown in FIGS. 12–17. In the FIG. 18, two sets of two dimensional CCD arrays 147 and 148 correspond to photodiode groups 133 and 134 in FIGS. 12 to 15, 140 and 141 in FIG. 16, and 143 and 144 in FIG. 17. Drive circuit 169 is adapted to drive photodiode groups 147 and 148 and outputs transfer clock pulses, reset pulses and shift pulses. The transfer clock pulses are adapted to drive CCD analog shift register provided for transfering the charge in each elemenet one by one, while the reset pulses are adapted for the reset of the charge of the output section. The shift pulses are adapted for transmitting the charges stored in the sensor portion to the CCD analog shift register. Amplifiers 149 and 150 amplify the signals output from photodiode groups 147 and 148 to desired levels. Sample hold circuits 151 and 152 sample-hold the outputs of amplifiers 149 and 150 at each time when they receive at their control terminals a clock pulse $\phi 1$. Difference detecting circuit 153 detects the amount of the difference between the outputs of sample hold circuits 151 and 152. Absolute value circuit 154 calculates the absolute value of the difference represented by the output of the difference detecting circuit. Adder circuit 155 adds the output of absolute value circuit 154 to the output of itself stored in capacitor 171 through analog switch 156 to accumulate the outputs successively produced at the timing of the generation of the transfer clock pulses $\phi 1$. Analog switch 156 is composed of, for example, an FET analog switch or the like and is enabled and disabled at the timing of the generation of the transfer clock pulses $\phi 1$ to hold the output of the adder circuit 155 which has accumulated the outputs generated from absolute value circuit 154 by that instantaneous time, so that the next output of the absolute value circuit 155 may be added to the accumulated ones.

Sequence control circuit 170 generates a control pulse $\phi 2$ each time when the output signals of one row of the photodiode arrays has been transferred to the sample-hold circuits 151 and 152. Capacitor 172 is connected with adder circuit 155 to store and hold the output of the adder circuit 155. A transistor connected across capacitor 172 short-circuits the latter and clears the memory in the capacitor 172 when the control signal is applied to its base. Delay circuit 173 delays the application of the control signal to the transistor for a time during which the transfer of the signals from the next row of the photodiode arrays is started. Accordingly, the accumulated output of adder circuit 155 is cleared by the delayed control signal from the delay circuit 173 when adder circuit 155 has completed, for each row of the photodiode array, the accumulation of the absolute values of the differences between the outputs of corresponding pairs of photodiodes in photodiode groups 147 and 148. Sample hold circuit 159 is directly responsive to the control pulse $\phi 2$ to sample-hold the one-row accumulated output of adder circuit 155. Peak hold circuit 158 is adapted to hold the peak value of the output of adder circuit 155 at the timing of receipt of the control pulse $\phi 2$ through analog switch 157. Sequence control circuit 170 generates control pulse $\phi 3$ each time the transfer of the output signals of the photodiode groups has been completed with respect to one page or image frame. Control signal $\phi3$ is applied to delay circuit 163 which, after a delay time from the receipt of control signal $\phi3$, generates a delayed signal $\phi3'$ which clears the signals held in peak hold circuit 158. Accordingly the output of adder circuit 155 is cleared by the output of delay circuit 173 after sample hold circuit 159 has held the output of adder circuit 155 and simultaneously peak hold circuit 158 has held the peak value of the output of adder circuit 155. Comparator 160 receives at its non-inverting input terminal the output of peak hold circuit 158 and at its inverting input terminal the output of sample hold circuit 159 to compare the received outputs. When the output of peak hold circuit 158 is equal to or larger that the output of sample hold circuit 159, comparator 160 generates a "High" level output. When the output of peak hold circuit 158 is less than the output of sample hold circuit 159, comparator 160 generates a "Low" level output. The output of comparator 160 enables and disables gate circuit 161 such that when the output of comparator 160 is at a "High" level, gate circuit 161 is enabled to transmit the signal from counter 164 to register 162 and when the output of comparator 160 is at a "Low" level, gate circuit 161 is disabled to block the signal from counter 164. Register 162 stores the signal output fed through gate circuit 161. The memory of register 162 is cleared by delayed signal $\phi3'$ supplied from delay circuit 163 after a delay time from the generation of control pulse $\phi3$. The control pulse is produced by sequence control circuit 170 at each time when the signals for one page or image frame have been transferred from photodiode arrays 147 and 148. Thus, the delay circuit 163 delays control pulse $\phi3$ and generated delayed signal $\phi3'$ which clears the memories of peak hold circuit 158, register 162 and counter 164. Counter 164 counts the number of control pulse $\phi2$ supplied from sequence control circuit 170 and is cleared by delayed control pulse $\phi3$ from delay circuit 163. AND gate 166 receives at its one input terminal the output of register 162 and at the other input terminal the control signal $\phi3$ to transmit the output signal of register 162 to comparator 167 upon receipt of control pulse $\phi3$. Accordingly, after the output of register 162 has been transmitted to comparator 167 at the timing of control pulse $\phi3$, the memories of register 162 and counter 164 are cleared by delayed control signal $\phi3'$.

Register 165 is adapted for generating digital data of the address of the photodiode arrays disposed on the position that are optically equivalent to the film plane. Digital comparator 167 compares the outputs of registers 162 and 165. When the outputs of the registors are equal to each other, comparator 167 causes indicator circuit 168 to make an in-focus indication. When the output of register 165 is larger than that of register 162, comparator 167 causes indicator circuit 168 to make an indication of the front-focusing condition i.e. the out-of-focus condition wherein the light rays passing through the objective lens are focused in front of the film plane. When the output of register 165 is less than that of register 162, comparator 167 causes indicator circuit 168 to make an indication of a rear-focusing condition i.e. the out-of-focus condition wherein the light rays passing through the objective lens are focused at the rear of the film plane. The focusing of the objective lens may be adjusted automatically if comparator 167 is replaced by a counter which counts the difference between the outputs of registers 162 and 165, and a drive control circuit for controlling the driving of the objective lens is associated with the counter such that when the outputs of registers 165 and 162 are equal to each other, the drive control circuit causes the objective lens to stop, when the output of register 165 is larger than that of register 162, the drive control circuit drives the objective lens rearwards by a distance commensurate with the difference of the outputs, and when the output of register 165 is less than that of register 162, the drive control circuit drives the objective lens forward by a distance commensurate with the difference of the outputs.

With the circuit construction as described above, when drive circuit 169 is driven to activate photodiode groups 147 and 148, delayed control pulse $\phi3'$ generated by delay circuit 163 after a lapse of a delay time from the generation of control pulse $\phi3$ from sequence control circuit 170, at first, clears peak hold circuit 158, register 162 and counter 164. Then, in response to the transfer clock pulses from drive circuit 169, photodiode groups 147 and 148 output photoelectric signals of the values depending on the luminance distribution on the photodiode groups, successively in time series, for example, from the signal of photodiode PD1 in photodiode arrays 18 and 24 shown in FIG. 2, then PD2, and then PD3, and so one. The time series outputs are amplified by amplifiers 149 and 150 and input sample hold circuits 151 and 152 to be sample-held thereby at the timing of clock pulse $\phi1$. Difference detecting circuit 153 detects the difference between the amplified and sample-held photoelectric signals of each corresponding pair of elements in photodiode arrays 147 and 148 and generates signals corresponding to the differences, the signals being changed to absolute value signals commensurate with their absolute values by absolute value circuit 154. The absolute value signals representative of the absolute values of the differences of outputs between corresponding elements in photodiode arrays 147 and 148, are successively generated in time series and added by adder circuit 155 to the signal stored in capacitor 172. As analog switch 156 is enabled and disabled at the timing of transfer clock pulses $\phi1$ to add the output datum generated by absolute value circuit 154 at the timing of a each transfer clock pulse $\phi1$, to the accumulated datum supplied at the time of the next transfer clock signal, capacitor 171 is to store the output datum of adder circuit 155 as the result of the addition at the preceding timing and the stored signal is added at next timing through the analog switch to the datum supplied from absolute value circuit 154. Thus, the time series signals successively supplied from absolute value circuit 154 is succeedingly added to the result of the preceding additions, with the new result stored in capacitor 172. It should be understood that, at the initial stage, the output level of added circuit 155 is zero and the signal input from absolute value circuit 154 is directly output therefrom. When the signal outputting from the last elements in the first row of photodiode groups 147 and 148, e.g. the elements PD16 in the rows 18 and 24 in FIG. 2, has been completed, sequence control circuit 170 generates control pulse $\phi2$ to change analog switch 57 from the enabled to the disabled state and at the same time causes the sample-holding operation of sample hold circuit 159. At this time, capacitor 172 which is connected to the output terminal of adder circuit 155, receives the signal as the result of the addition of the absolute values of the output differences between corresponding elements in one row, as a unit, in photodiode group 147 and 148. The signal represents the degree of coincidence of luminance distribution on the corresponding rows of photoelectric elements e.g. 18 and 24 in two photodiode groups. As described above, with respect to two photocell arrays on which the image plane is positioned, the luminance distribution on the photocell array in the upper group is equal to that in the lower group. When such arrays are away from (or off) the image plane, the luminance distributions thereon are not equal to each other and, in addition, the degree of the disagreement generally increases in the rows farther away from the image plane. Accordingly, the position of the image plane of the objective lens can be detected if the accumulated output of adder circuit 155 is detected for each of the arrays, the array of which accumulated outputs is minimum is selected, and the address of the selected array in the direction of the optical axis is detected. Accordingly, the output signals from adder circuit 155, which generates in time series the resulting data of above calculation for each of the arrays, decreases gradually row by row in the photodiode elements until the row of photodiode elements at the image plane position where the image is formed by the objective lens is reached. Then, the output increases gradually thereafter.

Figure 19A:
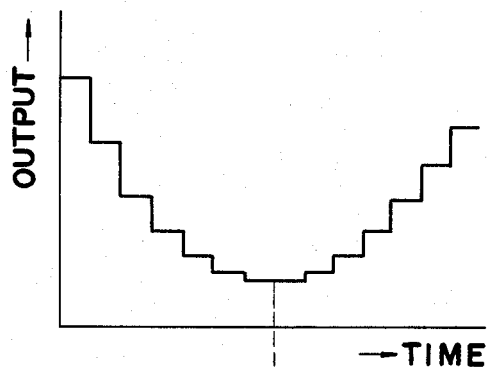
FIG. 19(A), 19(B) and 19(C) are graphes for illustrating the operation of the circuit shown in FIG. 18.
Figure 19B:
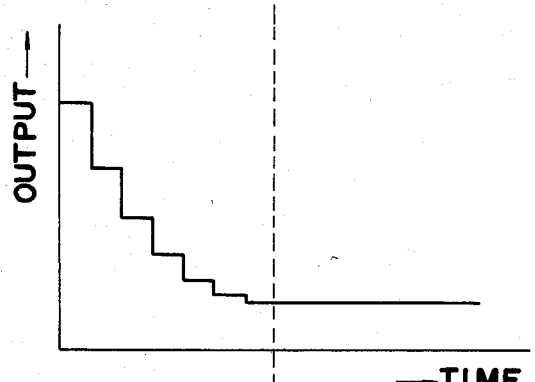
Figure 19C:
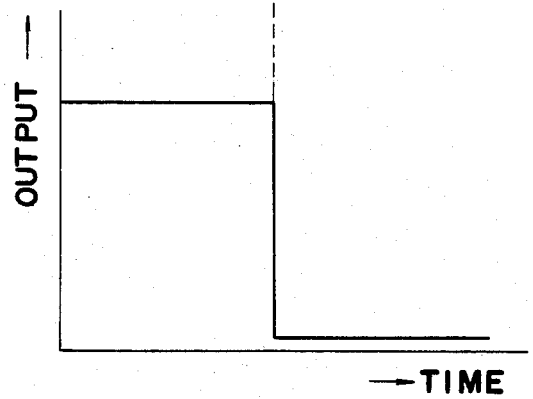

FIG. 19(a) is a graph showing an example of the change characteristic of the output of sample hold circuit 159 with respect to time while FIG. 19(b) is a graph showing the change of the output of peak hold circuit 158 with respect to time in the case of the example shown in FIG. 19(a). In this case, the output of comparator 160 which compares the outputs of peak hold circuit 158 and sample hold circuit 159 shows characteristics as in FIG. 9(c). As seen in the Figures, the output of peak hold circuit 158 decreases similarly to the output of the sample hold circuit but remains constant after reaching the peak value. Accordingly, the output of comparator 160 is at a "High" level until the peak value is reached and is at a "Low" level thereafter. The "High" level of the comparator output enables gate circuit 161 which transmits the output of counter 164 to register 162. Counter 164 counts control pulse $\phi 2$ which is generated from sequence control circuit 170 each time the transfer of a photoelectric signal for each one row in photodiode groups is completed, and generates a signal representative of the count. Hence, upon completion of the transfer of photoelectric output of photodiode groups for one page, image frame register 162 has memorized the address of the row of the photoelectric elements residing at the position of the image plane where the output of adder circuit 155 assumed a peak value. Then, upon the completion of the transfer of photoelectric outputs for one page or image frame, sequence control circuit 170 generates control pulse $\phi 3$, which unblocks AND gate 166 to transfer the address datum of the image position photoelectric element row stored in register 162 to comparator 167. Comparator 167 receives at its other input the output of register 165 in which has been set the address of the photoelectric element rows of photodiode arrays 147 and 148, the row residing at the position optically equivalent to the film plane. In accordance with the comparison of the contents of registers 162 and 165 by comparator 167, indicator circuit 168 indicates whether the plane of the image formed by the objective lens is in the front, just at or at the rear of the film plane.

With the embodiment of the construction as described above, a large number of focus detecting elements arranged along the optical axis can detect quantitatively the deviation of focus and may shorten the time for focusing the image forming optical system. Additionally, as the latter embodiment directly receives the focus detection light without interposition of a plane of a glass block as in the first embodiment, the end plane of the base glass block may not be polished and the adjustment of relative positions of the photodiodes on the two base plates is dispensed with, whereby the process of manufacturing may be simplified.

What is claimed is:

1. A focus device for detecting a focusing condition of an objective lens by receiving the light passed through the objective lens, comprising:

means for receiving the light rays passed through said objective lens to produce electrical signals, said light receiving means including a first photoelectric device which contains a plurality of photoelectric elements in contact with an optical axis of said objective lens in such a manner that said photoelectric elements are arranged in parallel with said optical axis for receiving the light rays passed through a first portion of said objective lens, and a second photoelectric device which contains a plurality of photoelectric elements in contact with the optical axis in such a manner that said photoelectric elements are arranged in parallel with said optical axis for receiving the light rays passed through a second portion of said objective lens with respect to a predetermined focal plane in accordance with said electrical signals from said light receiving means.

2. The invention of claim 2, wherein each of the photocell arrays of said first photoelectric device is cemented one on one with each of the photocell arrays of said second photoelectric device in a back-to-back relationship.

3. The invention of claim 2, further comprising a first transparent member on which the photocell arrays of said first photoelectric device are formed with their light receiving surface facing the first transparent member, a second transparent member on which the photocell arrays of said second photoelectric device are formed with their light receiving surface facing the second transparent member, and said first and second transparent members being cemented to each other to sandwich both of the photocell arrays of said first and second photoelectric devices.

4. The invention of claim 2, wherein said cemented first and second transparent members are disposed such that one of the photocell arrays of said first photoelectric device and one of the photocell arrays of said second photoelectric device cemented thereon are positioned across a predetermined plane optically equal to the predetermined focal plane on which the objective lens is focused.

5. The invention of claim 3, further comprising a concave mirror, formed on said first transparent member for introducing, to said first photoelectric device, the light rays which is passed through said second portion of the objective lens and which intersected the optical axis before the predetermined plane.

6. The invention of claim 2, wherein said defocus detecting means includes means for detecting a contrast on each of said photocell arrays based on the outputs of the photocells of said photocell array to generate a contrast signal corresponding of each detected contrast, means for comparing the contrast signal of each photocell array in said photoelectric device with the contrast signal of each photocell array cemented thereto in said second photoelectric device, means for descriminating a pair of said photocell arrays, cemented to each other, whose contrast signals are substantially equal to each other, and means for producing a position signal which represents a position along the optical axis on which said descriminated pair of said photocell arrays are disposed.

7. The invention of claim 6, wherein said contrast detecting means includes means for measuring each difference in outputs of two adjacent photocells in the photocell array, and means for summing up all of said difference for each photocell array to produce said contrast signal which represents the sum of said difference.

8. The invention of claim 2, wherein said photocell array is a photodiode array including plurality of photodiodes made of amorphous silicon.

9. A focus detecting device for detecting a focusing condition of an objective lens by receiving the light passed through the objective lens, comprising:
  means for receiving the light rays passed through said objective lens to produce electrical signals, said light receiving means including a first photoelectric device which contains a plurality of photoelectric elements arranged optically in parallel with an optical axis of the objective lens for receiving the light rays passed through a first portion of said objective lens, and a second photoelectric device which contains a plurality of photoelectric elements arranged optically in parallel with said optical axis for receiving the light rays passed through a second portion of said objective lens;
  means for detecting the amount and the direction of defocus of said objective lens with respect to a predetermined focal plane in accordance with said electrical signals from said light receiving means, and
  means for splitting the optical axis into two equivalent optical axes, said first and second photoelectric devices being disposed respectively in parallel with said two equivalent optical axes.

10. The invention of claim 10, wherein said splitting means is composed of a right triangular prism with two adjacent reflective planes making a right angle, said right triangular prism being disposed symmetrically with the optical axis of the objective lens, whereby the optical axis is splitted into two equivalent optical axes which extend along an identical line perpendicular to the optical axis.

11. The invention of claim 10, wherein said first and second photoelectric devices are located on a plane of a common substrate which is positioned perpendicularly to the optical axis.

12. The invention of claim 10, further comprising a pair of concave mirrors for reflecting the light bundles reflected on said two adjacent reflective planes to said first and second photoelectric devices.

13. The invention of claim 10, further comprising an optical member which includes said two adjacent reflective planes inside thereof, and an outer plane which is in parallel with said two equivalent optical axes, and wherein said first and second photoelectric devices are located on said outer plane with their light receiving surfaces facing toward the inside of said optical member.

14. The invention of claim 9, wherein said splitting means is composed of a pair of mirrors which are inclined by an identical angle with respect to the optical axis and which are spaced from each other along the optical axis such that the optical axis is splitted into two equivalent optical axes which are in parallel with, and spaced a predetermined distance from, each other.

15. The invention of claim 14, wherein said first and second photoelectric devices are disposed back to back with each other with their light receiving surfaces being in parallel with said two equivalent optical axes respectively.

16. The invention of claim 15, wherein said first and second photoelectric devices are respectively located on two sides of a common substrate, said two sides being in parallel with said two equivalent optical axes.

17. The invention of claim 9, wherein each of plurality of the photoelectric elements of said first and second photoelectric devices is a photocell array which consists of plurality of photocells arranged perpendicularly to each of said two equivalent optical axes, and wherein said photocell arrays are disposed in parallel with each other.

18. The invention of claim 17, wherein each of said first and second photoelectric devices is composed of an image sensing device in which plurality of photocells are arranged in two directions perpendicular to each other.

19. The invention of claim 17, wherein said defocus detecting means includes means for detecting the difference between each output of the photocells in said first photoelectric device and each output of the photocells corresponding thereof in said second photoelectric device, means for summing the difference for each photocell array.

20. The invention of claim 17, wherein said defocus detecting means includes means for detecting the difference of the outputs of each pair of two photocells disposed on an optically equivalent position with each other, means for calculating the absolute value of said difference of the outputs, means for summing up said absolute value for each pair of the photocell arrays, means for descriminating the pair of the photocell arrays for which the total absolute value summed up by said summing means is minimum, and means for producing a position signal representative of a position along the equivalent optical axes on which either descriminated photocell array is disposed.

21. A focus detecting device for detecting a focus condition of an objective lens by receiving the light passed through the objective lens, comprising:
  first image sensing device being composed of plurality of photoelectric elements arranged in two directions perpendicular to each other for detecting an image formed thereon by the light bundle passed through a first portion of the objective lens, said first image sensing device being disposed optically in parallel with the optical axis of the objective lens with said two directions extending in parallel with and perpendicularly to the optical axis,
  second image sensing device being composed of a plurality of photoelectric elements arranged in two directions perpendicular to each other for detecting another image formed thereon by the light bundle passed through a second portion of the objective lens, said second image sensing device being disposed optically in parallel with the optical axis with said two directions extending in parallel with and perpendicularly to the optical axis, means for detecting the position of the arrays of said photoelectric elements in said first and second image sensing devices across which the image plane of the objective lens is formed in accordance with the images detected by said first and second image sensing devices.

22. The invention of claim 21, wherein said first and second image sensing devices are disposed back to back with each other.

23. The invention of claim 21, wherein said first and second image sensing devices are positioned such that a pair of the arrays which are disposed back to back with each other and which are located perpendicularly to the optical axis are positioned across a predetermined focal plane on which the image should be formed.

24. The invention of claim 21, further comprising means for splitting the optical axis into two equivalent optical axes, and wherein said first and second image sensing devices are disposed in parallel with said two equivalent optical axes respectively.

25. The invention of claim 23 wherein said splitting means includes a right triangular prism with two adjacent reflective planes making a right angle, said two adjacent reflective planes being disposed symmetrically with the optical axis, whereby the optical axis is split into two equivalent optical axes which extend along an identical line perpendicular to the optical axis.

26. The invention of claim 25, wherein said first and second image sensing devices are located on a common substrate.

27. The invention of claim 24, wherein said splitting means includes a first mirror located with a predetermined inclination angle with the optical axis for reflecting the light bundle passed through said first portion of the objective lens to a predetermined direction, a second mirror located with said predetermined inclination angle with the optical axis with a predetermined distance apart from said first mirror for reflecting the light bundle passed through said second portion of the objective lens to a direction parallel with said predetermined direction, whereby the optical axis is split into two equivalent optical axes which extend in parallel with each other.

28. The invention of claim 27, wherein said first and second image sensing devices are located on both sides of a common substrate respectively.

29. The invention of claim 21, further comprising means for producing a signal which represents the position of the predetermined focal plane on which the image should be formed, and means for detecting the amount and the direction of the defocus of the objective lens by comparing said position detected by said position detecting means with the position represented by said signal.

30. A focus detecting device for detecting a focusing condition of an objective lens by receiving the light passed through the objective lens, comprising:

means for receiving the light passed through said objective lens to produce electrical signals, said light receiving means including a photocell array which contains a plurality of photoelectric elements arranged optically to be perpendicular with an optical axis of said objective lens for receiving the light rays passed through a first portion of said objective lens, and a second photocell array which contains a plurality of photoelectric elements arranged optically to be perpendicular with said optical axis for receiving the light rays passed through a second portion of said objective lens, and means for detecting the amount and the direction of defocus of said objective lens with respect to a predetermined focal plane in accordance with said electrical signals from said light receiving means wherein said photocell arrays are disposed in parallel with each other.

31. The invention of claim 1, wherein the photocell arrays of said first photoelectric device and the photocell arrays of said second photoelectric device are in contact with each other on the rear sides thereof such that the light receiving surface of said first photoelectric device faces to the opposite directions to which the light receiving surface of said second photoelectric device directs.

* * * * *